United States Patent
Yamazaki

(10) Patent No.: US 10,761,518 B2
(45) Date of Patent: Sep. 1, 2020

(54) PRODUCT INPUT PLAN DEVELOPING DEVICE, PRODUCT INPUT PLAN DEVELOPING METHOD, AND PRODUCT INPUT PLAN DEVELOPING PROGRAM

(71) Applicant: FUJITSU LIMITED, Kawasaki-shi, Kanagawa (JP)

(72) Inventor: Takashi Yamazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/155,949

(22) Filed: Oct. 10, 2018

(65) Prior Publication Data
US 2019/0041834 A1 Feb. 7, 2019

Related U.S. Application Data

(63) Continuation of application No. PCT/JP2016/063073, filed on Apr. 26, 2016.

(51) Int. Cl.
*G05B 19/418* (2006.01)
*G06Q 10/06* (2012.01)

(52) U.S. Cl.
CPC ..... *G05B 19/41865* (2013.01); *G05B 19/418* (2013.01); *G06Q 10/0631* (2013.01);
(Continued)

(58) Field of Classification Search
CPC ............ G05B 19/418; G05B 19/41865; G05B 2219/31053; G05B 2219/32111;
(Continued)

(56) References Cited

U.S. PATENT DOCUMENTS

| | | | |
|---|---|---|---|
| 6,597,962 B2 * | 7/2003 | Nonaka | G06Q 10/06 700/97 |
| 6,714,947 B2 * | 3/2004 | Fa | G06Q 10/06 707/999.107 |

(Continued)

FOREIGN PATENT DOCUMENTS

| | | |
|---|---|---|
| JP | 2002-312020 | 10/2002 |
| JP | 2006-260462 | 9/2006 |

(Continued)

OTHER PUBLICATIONS

EESR—Extended European Search Report dated Apr. 25, 2019 from European Patent Application No. 16900390.2. ** Reference JP2002-312020 cited in the EESR was previously submitted in the IDS filed on Oct. 10, 2018.

(Continued)

*Primary Examiner* — Abdelmoniem I Elamin
(74) *Attorney, Agent, or Firm* — Fujitsu Patent Center

(57) ABSTRACT

A product-input-plan developing device for developing product input plans including an input order of products to a manufacture line that includes a branch and a merge, and paths along which the products individually flow in the manufacture line, includes a processor configured to optimize product input plans for k number of products for which a product input plan is developable without causing information explosion from among the products to be input to the manufacture line; and determine adoption of product input plans for first n (n<k) number of products from among the product input plans optimized by the processor, wherein the processor repeatedly executes the process for optimizing the product input plan and the processor repeatedly executes the process for determination for a product for which adoption of the product input plan is not determined by the processor.

9 Claims, 10 Drawing Sheets

(52) U.S. Cl.
CPC ..... *G05B 2219/31053* (2013.01); *Y02P 90/02* (2015.11); *Y02P 90/18* (2015.11); *Y02P 90/20* (2015.11)

(58) Field of Classification Search
CPC ..... G06Q 10/0631; Y02P 90/02; Y02P 90/18; Y02P 90/20
See application file for complete search history.

(56) References Cited

U.S. PATENT DOCUMENTS

| | | | | |
|---|---|---|---|---|
| 8,086,595 | B2* | 12/2011 | Ruml | G06F 16/9024 707/713 |
| 8,290,607 | B2* | 10/2012 | Couronne | G06Q 10/06 700/100 |
| 9,841,755 | B2* | 12/2017 | Yasuma | G05B 19/41865 |
| 2003/0046262 | A1* | 3/2003 | Shih | G06Q 10/06 |
| 2003/0050817 | A1* | 3/2003 | Cargille | G06Q 10/06 705/7.22 |
| 2003/0083765 | A1* | 5/2003 | Nonaka | G06Q 10/06 700/99 |
| 2007/0129978 | A1* | 6/2007 | Shirasu | G06Q 10/06 705/7.11 |
| 2012/0239167 | A1 | 9/2012 | Carrette | |

FOREIGN PATENT DOCUMENTS

| | | |
|---|---|---|
| JP | 2007-072527 | 3/2007 |
| JP | 2009-258863 | 11/2009 |
| JP | 2013-513166 | 4/2013 |

OTHER PUBLICATIONS

Alistair R. Clark et al.,"Rolling-horizon lot-sizing when set-up times are sequence-dependent", International Journal of Production Research., vol. 38, No. 10, Jul. 1, 2000, pp. 2287-2307, XP055577414. Cited in EESR dated Apr. 25, 2019 corresponding to European Patent Application No. 16900390.2.

Suresh Chand et al.,"Forecast, Solution, and Rolling Horizons in Operations Management Problems: A Classified Bibliography", Manufacturing & Service Operations Management, vol. 4, No. 1, Jan. 1, 2002, pp. 25-43, XP055577631. Cited in EESR dated Apr. 25, 2019 corresponding to European Patent Application No. 16900390. 2.

International Search Report and Written Opinion of the International Searching Authority, mailed in connection with PCT/JP2016/063073 dated May 24, 2016 (7 pages), with partial translation.

* cited by examiner

FIG.5A

<INPUT PRODUCT DB 30>

| NUMBER | PRODUCT |
|---|---|
| 1 | D001-001 |
| 2 | D001-001 |
| 3 | D002-626RA |
| 4 | D002-626RA |
| 5 | D002-626RA |
| 6 | D002-626RA |
| 7 | D002-626RA |
| 8 | D002-626RA |
| 9 | D003-B80240 |
| 10 | D003-B80240 |
| 11 | D003-B80240 |
| 12 | D004-B60416 |
| ... | ... |

FIG.5B

<PRODUCT DETAILED INFORMATION DB 32>

| PRODUCT | DEVICE THAT CAN BE PASSED THROUGH PROCESS A | DEVICE THAT CAN BE PASSED THROUGH PROCESS B | ... |
|---|---|---|---|
| D001-001 | 1, 2 | 1, 2 | ... |
| D002-626RA | 1, 2 | 1, 2 | ... |
| D003-B80240 | 2 | 1, 2 | ... |
| D002-626RA | 1 | 2 | ... |
| ... | ... | ... | ... |

FIG. 8

| PRODUCT | DEVICE THAT CAN BE PASSED THROUGH PROCESS A | BEFORE OPTIMIZATION | AFTER OPTIMIZATION |
|---|---|---|---|
| D001-001 | 1, 2 | 1 | 2 |
| D001-001 | 1, 2 | 1 | 2 |
| D002-626RA | 1, 2 | 1 | 1 |
| D002-626RA | 1, 2 | 1 | 2 |
| D002-626RA | 1, 2 | 1 | 1 |
| D002-626RA | 1, 2 | 1 | 2 |
| D002-626RA | 1, 2 | 1 | 1 |
| D002-626RA | 1, 2 | 1 | 1 |
| D003-B80240 | 2 | 2 | 2 |
| D003-B80240 | 2 | 2 | 2 |
| D003-B80240 | 2 | 2 | 2 |
| D004-B60416 | 1 | 1 | 1 |

PRODUCT INPUT PLAN DEVELOPING DEVICE, PRODUCT INPUT PLAN DEVELOPING METHOD, AND PRODUCT INPUT PLAN DEVELOPING PROGRAM

CROSS-REFERENCE TO RELATED APPLICATION

This application is a continuation application of International Application PCT/JP2016/063073 filed on Apr. 26, 2016 and designated the U.S., the entire contents of which are incorporated herein by reference.

FIELD

The present invention relates to a product input plan developing device, a product input plan developing method and a product input plan developing program.

BACKGROUND

Conventionally, at a manufacturing site, mass production in which similar products are successively input right-orderly to one manufacture line has been a mainstream. Recently, however, the customary of individual products has been increasing, and therefore, manufacturing sites of multi-product small-volume production are increasing.

A product input to a manufacture line is manufactured passing through a plurality of processes while advancing the line. At each process, the line is sometimes branched and different devices are sometimes provided at destinations of the branches. Therefore, it is necessary to select for each product to which branch the product is to be advanced and by which device the product is to be manufactured. Also the residence time period (manufacture time period) differs among different devices. Since, in a manufacture line, the number of factors for determining input timings of products or devices through which the products are to pass is great in this manner, it is not easy to achieve optimization.

It is to be noted that Japanese Laid-open Patent Publication Nos. 2006-260462, 2009-258863, and 2013-513166 and so forth disclose a technology relating to planning of a production plan (production schedule), optimization of manufacturing processing and so forth.

SUMMARY

According to one aspect of the embodiments, a product input plan developing device for developing product input plans including an input order of a plurality of products to a manufacture line that includes a branch and a merge, and paths along which the plurality of products individually flow in the manufacture line, the product input plan developing device including: a memory; and a processor coupled to the memory, wherein the processor optimizes product input plans for k number of products for which a product input plan is developable without causing information explosion from among the plurality of products to be input to the manufacture line, determines adoption of product input plans for first n (n<k) number of products from among the optimized product input plans, and repeatedly executes process for optimizing the product input plan and repeatedly executes the process for determination, for a product for which adoption of the product input plan is not determined.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a view depicting an example of a data structure of an input product DB, and FIG. 5B is a view depicting an example of a data structure of a product detailed information DB.

FIG. 8 is a view illustrating a working example.

DESCRIPTION OF EMBODIMENTS

For example, in a general optimization method, while a product input order or the like is changed, calculation of various evaluation indexes (for example, a throughput, an occupancy rate of a device and so forth) is repeated, and an optimum product input order is determined based on the calculated evaluation indexes.

In this case, since the number of combinations increases by a power, information explosion occurs shortly and it is extremely difficult to search out an optimum value.

In the following, an embodiment of a manufacturing system is described in detail with reference to FIGS. 1 to 8.

Figure 1:
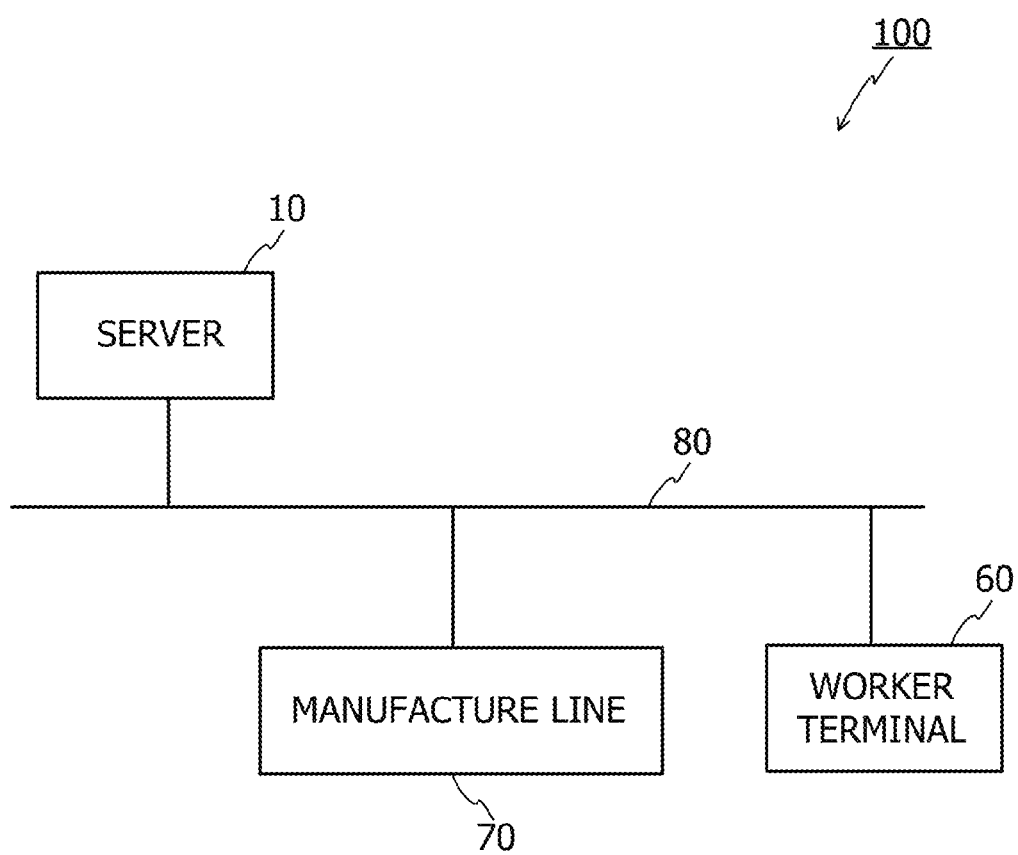
FIG. 1 is a view schematically depicting a configuration of a manufacturing system according to one embodiment.

FIG. 1 schematically depicts a configuration of a manufacturing system 100 according to the embodiment. As depicted in FIG. 1, the manufacturing system 100 of the present embodiment includes a manufacture line 70, a server 10 as a product input plan developing device, and a worker terminal 60. The manufacture line 70, server 10 and worker terminal 60 are coupled to each other by a network 80.

Figure 2:
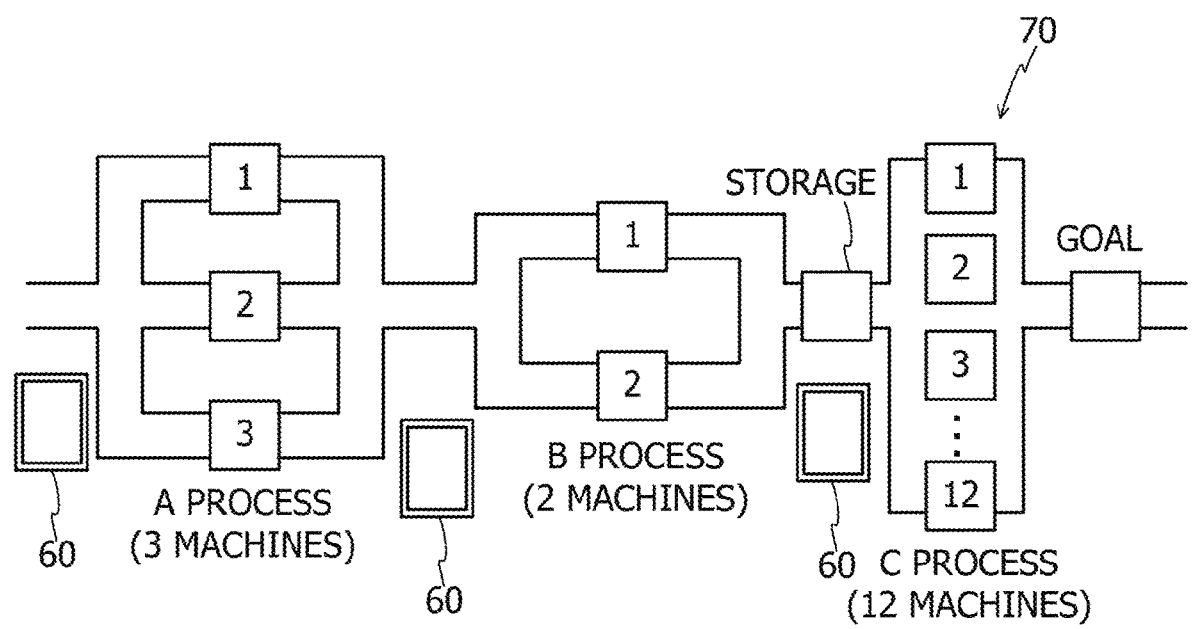
FIG. 2 is a view depicting a manufacturing system.

The manufacture line 70 includes, as an example, as depicted in FIG. 2, devices (three machines) belonging to an A process, devices (two machines) belonging to a B process, a storage, and devices (12 machines) belonging to a C process. Between different processes, a belt conveyor is provided. The belt conveyor has a branch and a merge such that a product passes through one of the devices of the A process, one of the devices of the B process and one of the devices of the C process before the product arrives at a goal. It is to be noted that, at each branch, the manufacture line 70 may automatically control the direction to which the product is to advance based on an input plan for the product, or a worker disposed at the branch may operate the direction to which the product is to advance based on an input plan for the product. It is to be noted that, at each process, for example, assembly, inspection, packing and so forth are executed.

Referring back to FIG. 1, the server 10 plans input plans for products based on information of the input products determined in advance or on detailed information of the products. Further, the server 10 transmits the planned input plans for the products to the manufacture line 70 or the worker terminal 60.

Figure 3:
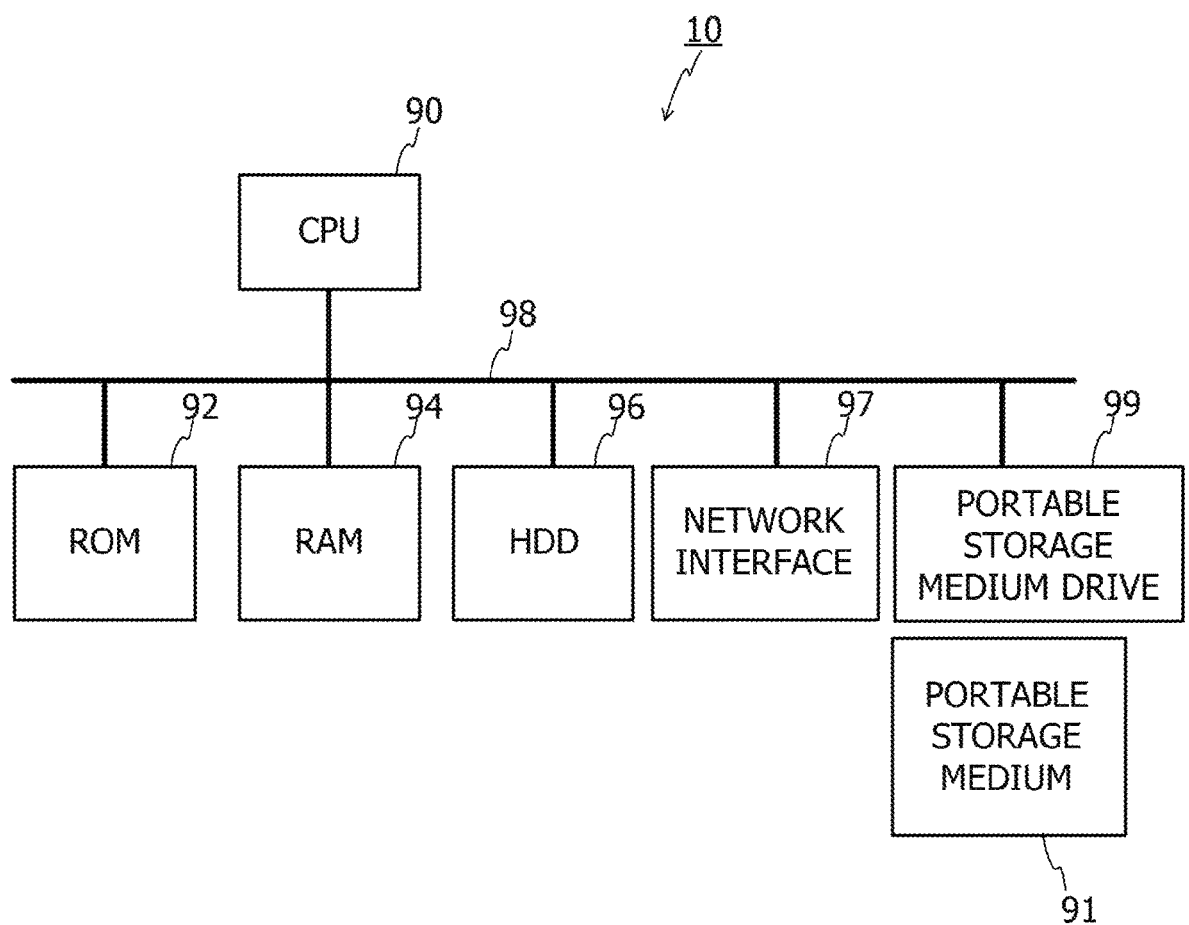
FIG. 3 is a view depicting a hardware configuration of a sever.

FIG. 3 depicts a hardware configuration of the server 10. As depicted in FIG. 3, the server 10 includes a central processing unit (CPU) 90, a read only memory (ROM) 92, a random-access memory (RAM) 94, a storage unit (here, a hard disk drive (HDD)) 96, a network interface 97, a portable storage medium drive 99 and so forth. The components mentioned of the server 10 are coupled to a bus 98. In the server 10, a program stored in the ROM 92 or the HDD 96 (including a product input plan developing program) or a program read from a portable storage medium 91 by the portable storage medium drive 99 (including the product input plan developing program) is executed by the CPU 90 to implement functions as the various units depicted in FIG. 4.

Figure 4:
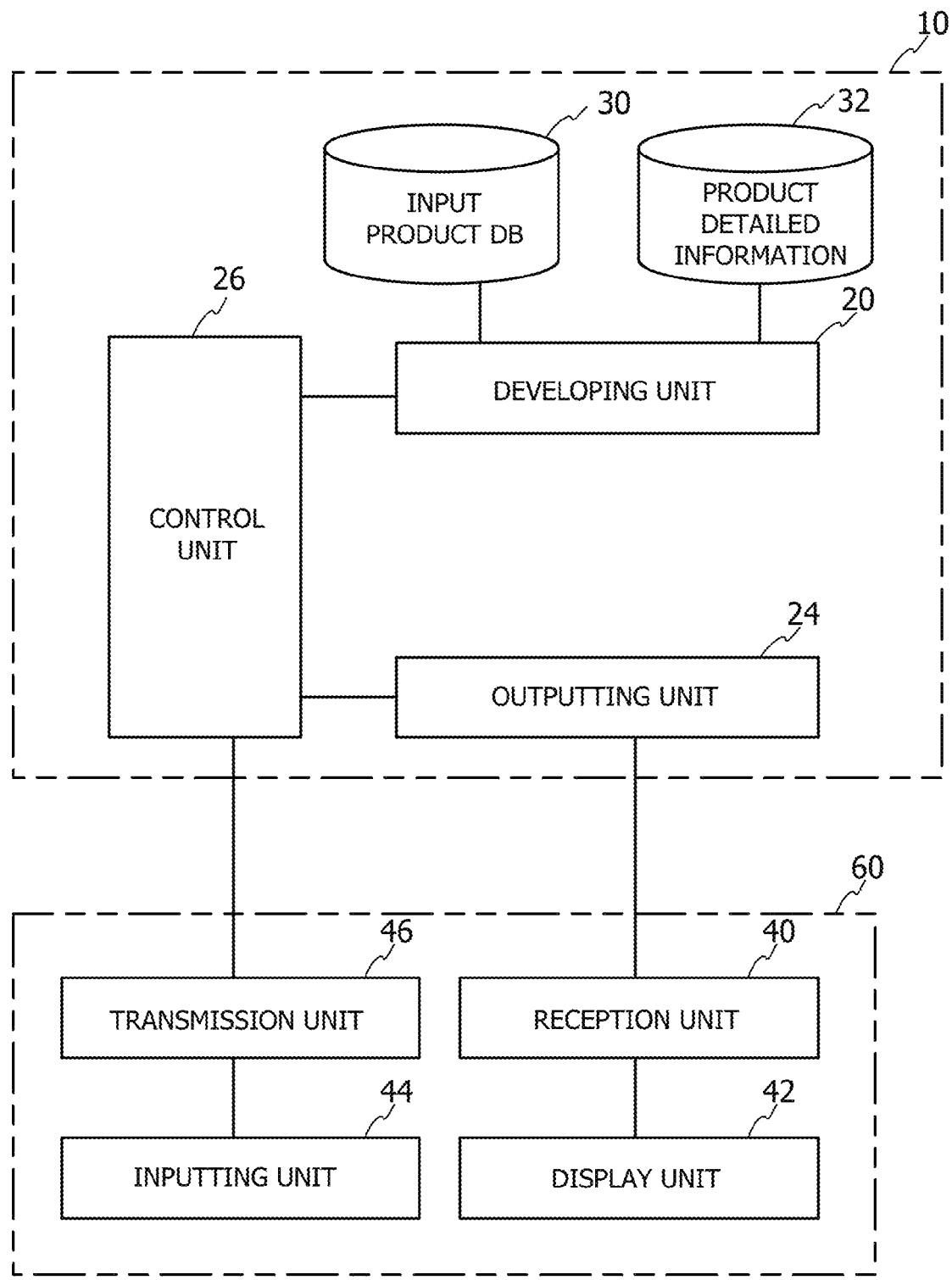
FIG. 4 is a block diagram depicting functions of a server and a worker terminal.

FIG. 4 depicts a functional block diagram of the server 10. The CPU 90 functions as a developing unit 20, an outputting unit 24 and a control unit 26 depicted in FIG. 4 by executing the program. It is to be noted that, in FIG. 4, also an input product DB (database) 30 and a product detailed information DB 32 stored in the HDD 96 or the like of the server 10 are depicted.

The developing unit 20 acquires information from the input product DB 30 and the product detailed information DB 32 and optimizes a product input plan based on the acquired information. Here, the input product DB 30 and the product detailed information DB 32 are described with reference to FIGS. 5A and 5B.

As depicted in FIG. 5A, the input product DB 30 is a list of model numbers of products that are to be input to the manufacture line 70. The product detailed information DB 32 is a database for storing detailed information of the products and has stored therein information of devices through which the products can be passed at the individual processes as depicted in FIG. 5B.

The developing unit 20 uses a simplified simulator for a multi-product small-volume manufacture line (hereinafter referred to as line simulator) as a solver for visualizing and numerically evaluating products virtually flowing in the manufacture line 70.

Figure 6:
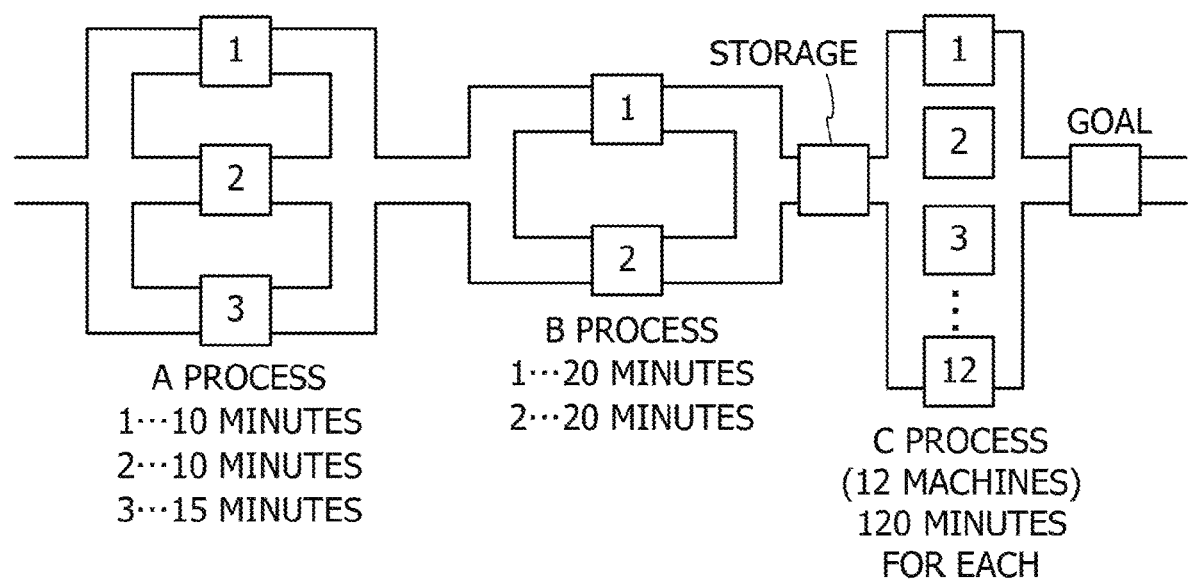
FIG. 6 is a view depicting an example of a line simulator.

A simple concept of a line simulator is executed by such very simple model calculation that the manufacture line 70 is divided into small spaces and, if a succeeding space becomes empty, a product flows into the space. FIG. 6 depicts a simple model of the line simulator. The number and so forth of devices of the line simulator of FIG. 6 are similar to those of the manufacture line 70 of FIG. 2.

A product input to the manufacture line stays for a residence time period according to specifications thereof at a device of each process in accordance with the specifications and thereafter leaves the device. Here, in the line simulator, it is significant what is to be optimized and what index is to be applied as an index (objective function) for optimization. In the present embodiment, for example, the objective function may be a throughput time period (period of time after start of inputting until all products reach the goal of FIG. 6). Alternatively, as the objective function, it is possible to use, for example, a maximum store number into the storage, the cost at each process, the occupancy rate of each device, the delivery time compliance rate and so forth.

Further, in the present embodiment, a concept of a real time optimization algorithm is introduced to develop an input plan for products by such pieces of processing as described below.

(1) Input plans for a number of (k: for example, 12) products with which a product input plan can be developed without causing information explosion (combination explosion) from among products to be input to the manufacture line 70 as a near future prediction are optimized.

(2) From among the optimized product input plans, product input plans for first n (for example, one) number of products are adopted.

(3) The pieces of processing of (1) and (2) are repeated excluding any product for which a product input plan is determined.

In the present embodiment, for example, by performing the pieces of processing of (1) and (2) at input intervals of products, a product can be input newly to the manufacture line 70 based on the product input plans developed in (2). In this case, even if such a situation that interruption by an express product occurs or some device fails or else an error product is generated occurs, a new product input plan can be developed immediately, and therefore, there is a characteristic that the influence of a disturbance such as interruption, failure or the like is less likely to be had.

Further, since the pieces of processing of (1) and (2) may be performed after a comparatively long period of time like input intervals of products, upon development of a product input plan, multi-objective optimization using a plurality of objective functions can be performed. For the multi-objective optimization, a genetic algorithm or an annealing method can be used. Consequently, a product input plan more appropriate than that by single-objective optimization can be developed. It is to be noted that, upon optimization, single-objective optimization may be used, and in this case, a simplex method or a genetic algorithm can be used.

The outputting unit 24 transmits the input plans for products developed by the developing unit 20 to the manufacture line 70 or outputs (transmits) the input plans for products to the worker terminal 60.

The control unit 26 receives conditions for optimization and so forth input through the worker terminal 60 by the worker and sets and transmits an optimization index to the developing unit 20. Further, the control unit 26 controls processing starting timings and so forth of the developing unit 20 and the outputting unit 24.

Referring back to FIG. 1, the worker terminal 60 is a terminal installed in the proximity of the manufacture line 70 and is assumed to be a personal computer (PC), a tablet type terminal, a smartphone or the like. The worker terminal 60 includes a display and displays a product input plan determined by the server 10 to support a work by the worker. The worker terminal 60 includes a reception unit 40, a display unit 42, an inputting unit 44 and a transmission unit 46 as depicted in FIG. 4. The reception unit 40 receives information (information of a product input plan) transmitted from the outputting unit 24 of the server 10 and transmits the information to the display unit 42. The display unit 42 displays information received from the reception unit 40 (information of a product input plan). The inputting unit 44 acquires information of conditions for optimization input by the user and the current situation of the manufacture line 70 (whether or not there is a failure or the like) and transmits the acquired information to the transmission unit 46. The transmission unit 46 transmits the information received from the inputting unit 44 to the control unit of the server 10.

(Product Input Plan Developing Processing by Server 10)

Now, the product input plan developing processing by the server 10 is described in detail with reference to a flow chart of FIG. 7. It is to be noted that, in the present embodiment, a case is described in which, before a point of time after a certain product is input until a next product is input, an input plan for the next product is created.

Figure 7:
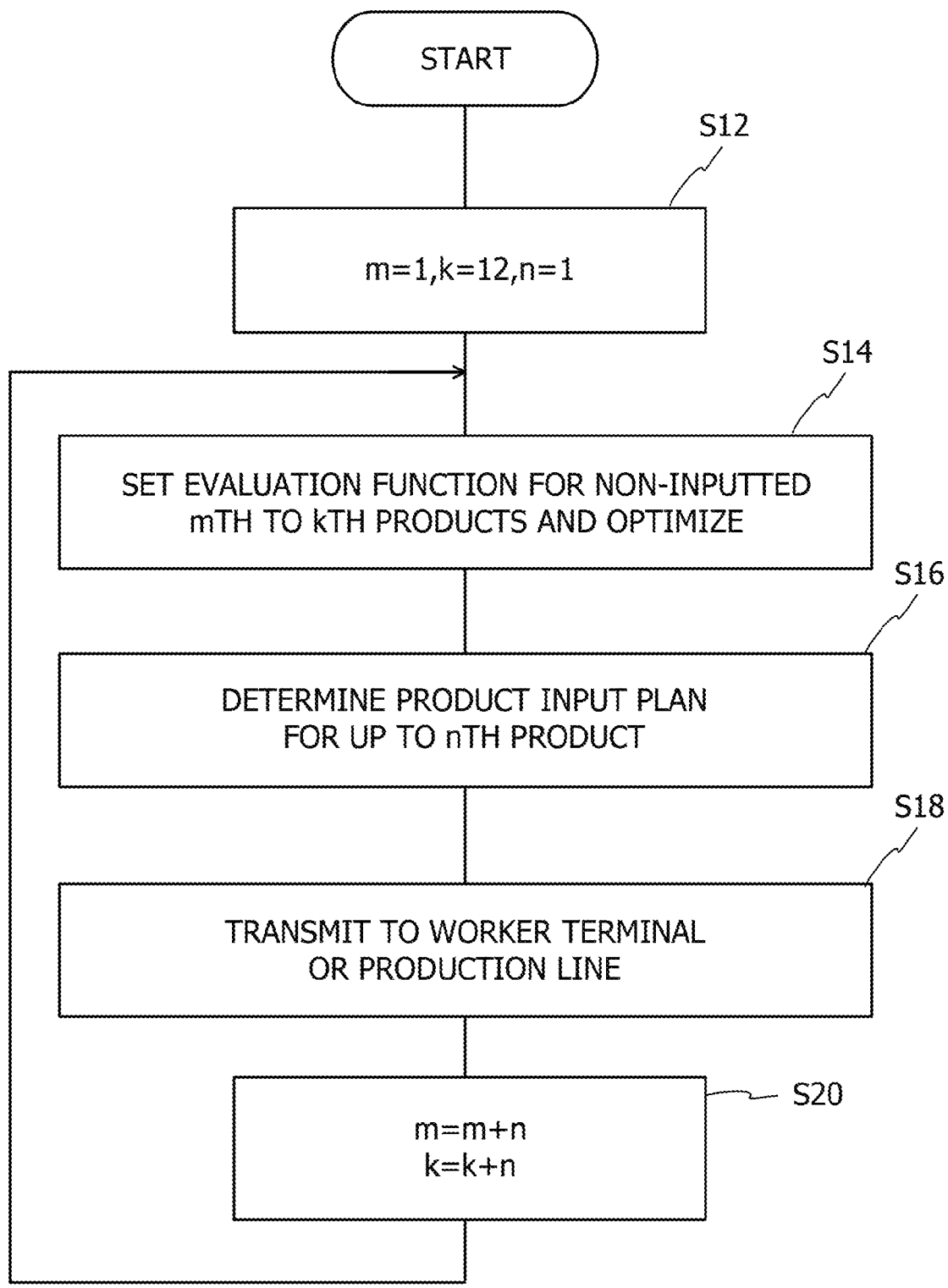
FIG. 7 is a flow chart depicting processing of a server.

In the processing of FIG. 7, first at step S12, the developing unit 20 sets values of m, k and n. m and k are parameters indicative of a number of a product, and it is assumed here that m=1 and k=12 are set. Meanwhile, n is a parameter indicative of a quantity of products for which a product input plan is to be adopted in single time processing, and it is assumed here that n=1 is set. It is to be noted that, although the value of m is normally set to 1, the value of k differs depending upon the processing capacity of the server 10, the number of variables to be input in optimization, the number of restrictions, the number of objective functions and so forth. In the case where, before a point of time after a certain product is input until a next product is input, an input plan for the next product is created as in the present embodiment, k may be a maximum value of the number of products for which an input plan can be optimized before a point of time at which a next product is input. Further, in the case where, before a point of time after a certain product is input until a next product is input, an input plan for the next product is to be created as in the present embodiment, n is set to n=1. It is to be noted that, in the case where, before a point of time after a certain product is input until a second next product is input, input plans for the next product and the second next product are to be created as in the present embodiment, n is set to n=2.

Then at step S14, the developing unit 20 sets evaluation functions for non-input mth to kth products (first to 12th products) and performs optimization. In particular, the developing unit 20 uses, as a variable for the products of the numbers 1 to 12 in the input product DB 30 of FIG. 5A, a product input order to the manufacture line 70, a product input interval, product branch information or the like and determines (optimizes) the variable using a throughput time period or the like as an objective function such that the objective function may be minimized using a genetic algorithm, an annealing method or the like. By this, the product input plans for 12 products can be optimized.

Then at step S16, the developing unit 20 determines product input plans for the first to nth (first) products from among the 12 products for which a product input plan is developed. In this case, the developing unit 20 adopts only the first one product input plan from among the product input plans for the 12 products and discards the product input plans for the other 11 products. It is to be noted that, in the present embodiment, the pieces of processing at steps S14 and S16 are completed before a next product is input.

Then at step S18, the outputting unit 24 transmits information of the nth (first) product input plan determined at step S16 to the worker terminal 60 or the manufacture line 70. For example, in the case where the information of the first product input plan is transmitted to the worker terminal 60, the information is displayed on the display unit 42 of the worker terminal 60. If the worker watches the display unit 42, the worker can recognize to which device and at which timing the next product is to be passed, and therefore, if the worker moves the product based on the information, manufacture according to the product input plan can be implemented. Further, for example, in the case where the information of the first product input plan is transmitted to the manufacture line 70, the manufacture line 70 can automatically switch toward which device and at which timing the product is to be flowed. By this, manufacture in accordance with the product input plan can be implemented.

Then at step S20, the developing unit 20 changes m to m+n and changes k to k+n. In the present embodiment, the developing unit 20 changes m (=1) to m+1 (=2) and changes k (=12) to k+1 (=13). Thereafter, the processing returns to step S14.

After the processing returns to step S14, the developing unit 20 develops product input plans for the second to 13th products, and at step S16, the developing unit 20 adopts the product input plan for the first product and discards the other product input plans. Then, the outputting unit 24 transmits the product input plan for the next product adopted by the developing unit 20 to the worker terminal 60 or the manufacture line 70 at step S18. Further, the developing unit 20 changes m to m+n and changes the k to k+n. Thereafter, the pieces of processing at steps S14 to S20 are repeated until the product input plans for all products are determined.

In the case where, for example, interruption by an express product occurs in the processing of FIG. 7, the developing unit 20 may determine k number of product input plans including that for the express product under the instruction of the control unit 26 taking it into consideration that an interruption by an express product occurs at step S14. For example, if the optimization condition is changed such that a route along which the express product will arrive earliest at the goal is presented as the optimization index, it can be always presented that the product is flowing at present and, forecasting the future, to which route the product can be flowed optimally. In this manner, even if an interruption by an express product occurs, a product input plan can be determined flexibly. Further, also in the case where a device in the manufacture line 70 fails, k number of product input plans may be determined taking the failure of the device as a restriction (restraint condition) into account at step S14. Consequently, even if a failure of a device occurs, a product input plan can be determined flexibly.

Working Example

Here, as a working example, developing of a product input plan is performed in such a manner as described above for the manufacture line 70 of FIG. 2. As detailed restraint conditions in the present working example, it is applied as conditions that which device is to be passed at each process differs depending upon a plan for one day and that a device that can be passed is restricted depending upon a product, and a model proximate to a real manufacture line is taken into consideration. Further, which device is to be passed by each product in order to achieve an optimum throughput is used as an evaluation index to execute optimization. It is to be noted that, in the present working example, while the order of products is fixed, only branch information is used as a variable to perform optimization.

FIG. 8 depicts plans before optimization and plans after optimization side by side. In the present working example, since it is an object to decide to which device a product that is currently flowed in the manufacture line 70 is to be flowed at the branch at the process A to achieve optimization, only products that are to pass a fixed device at the process B are flowed intentionally to the manufacture line 70 and besides only two machines are used also at the process A.

As a result of the optimization of the branch at the process A, it is found that, with respect to a throughput before the optimization, after the optimization, the time can be reduced by 26%. Further, also from the results of optimization of FIG. 8, a solution is obtained that, if, while products are passed only to a device 1 at the process A before optimization, after the optimization, products can be passed also to a device 2, it is optimum to level the frequencies in which products are passed to the device 1 and the device 2. Further, since a device to which the second to fourth products from below can be flowed at the process A is determined to the device 2, an intuitive result that people can think that products preceding to them are preferably passed to the device 1 is obtained.

It is to be noted that, in the present embodiment, the developing unit 20 is included such that an optimization unit that that includes and optimizes product input plans and a determination unit that determines adoption of product input plans for first n number of products from among the optimized product input plans are implemented.

As described in detail above, according to the present embodiment, the developing unit 20 optimizes product input plans for k (for example, k=12) number of products for which a product input plan can be developed without causing information explosion from among a plurality of products to be input to the manufacture line 70 that has a branch and a merge (S14) and determines adoption of product input plans for first n (for example, n=1) number of products from among the optimized product input plans (S16). Then, the developing unit 20 repeatedly executes, for products for which adoption of a product input plan is not determined, the processing for developing a product input plan and the processing for determining adoption of the product input plan. Consequently, in the present embodiment, a product input plan for a product to be input to a manufacture line that includes a branch and a merge can be developed appropriately without causing information explosion. Further, since also it is possible to determine, within a period after a product is input to the manufacture line 70 until a next product is input, a product input plan for the next product, even in the case where an interruption by an express product occurs or a failure of a device occurs, an appropriate product input plan can be determined flexibly.

Further, in the present embodiment, since the developing unit 20 optimizes a product input plan by multi-objective optimization, it can develop a product input plan more appropriately than that in the case of single-objective optimization.

Further, in the present embodiment, the number (n) of products for which adoption of a product input plan is determined using a result of optimization of a single time product input plan is determined in response to an interval with which the product input plan is optimized (a processing time period required for optimization). Consequently, occurrence of such a situation that, when a product is input, a product input plan therefor does not exist can be prevented.

It is to be noted that the embodiment described above is directed a case in which the processing of FIG. 7 is executed in parallel to inputting of a product to the manufacture line 70 and an input plan for a product to be input next is developed substantially on the real time basis. However, the developing of a product input plan is not limited to this, and for example, by executing the processing of FIG. 7 after operation for one day of the manufacture line 70 ends before operation for the next day is started, a product input plan for the next day may be developed. Then, while the manufacture line 70 may be operated in accordance with the developed product input plan, the processing of FIG. 9 is executed.

Figure 9:
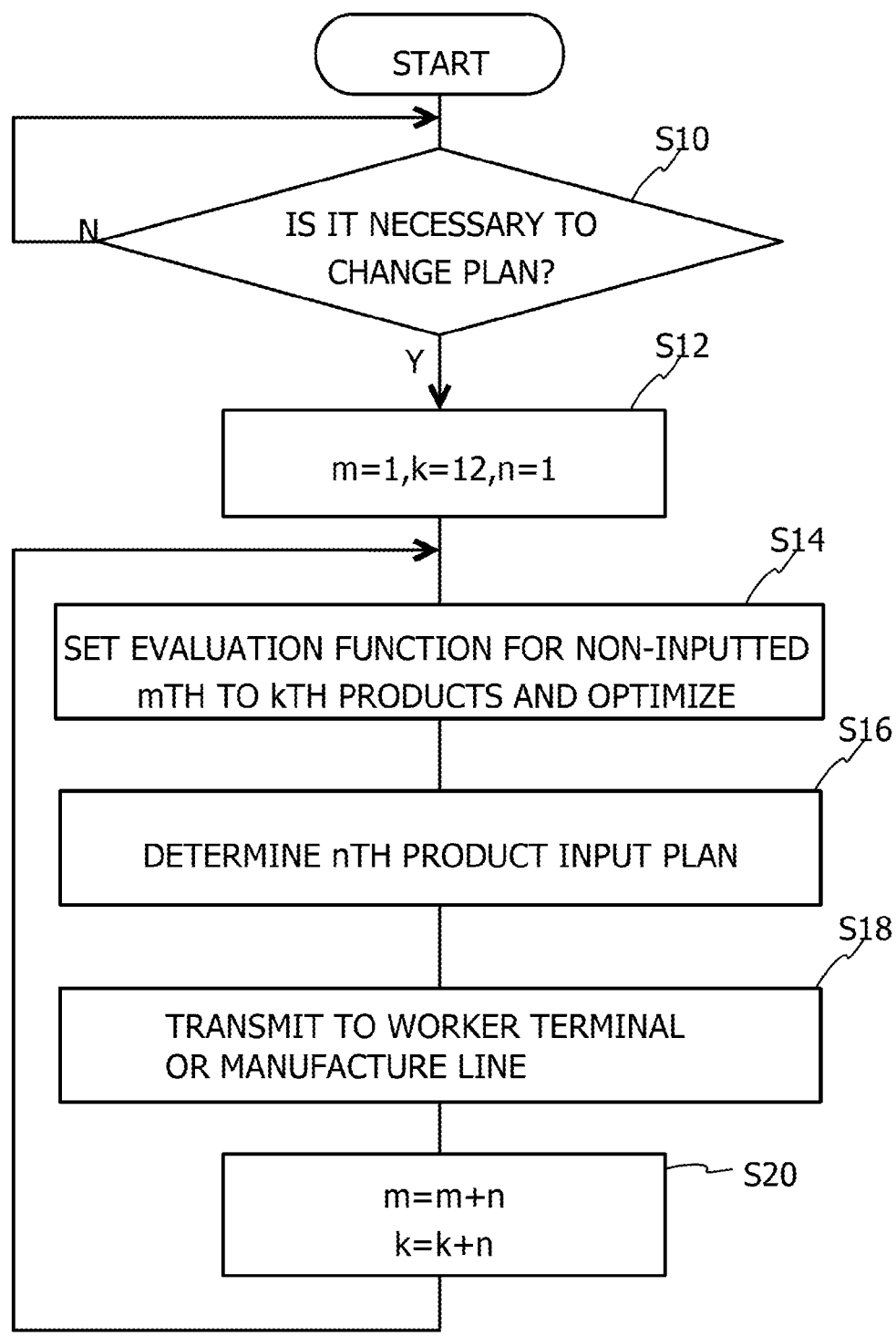
FIG. 9 is a flow chart depicting a modification.

In the processing of FIG. 9, at step S10, the control unit 26 stands by until it becomes necessary to change a plan. Here, that it becomes necessary to change a plan corresponds to a case in which interruption by an express product occurs, another case in which, because a delay occurs with the plan, it is necessary to re-develop a plan, a further case in which a device fails or a like case. The control unit 26 can decide, from information obtained from the manufacture line 70, whether it has become necessary to change a plan or decide, based on an input from the worker to the worker terminal 60, whether it has become necessary to change a plan.

In the case where the decision at step S10 is in the affirmative, namely, in the case where it has become necessary to change a plan, the processing advances to step S12 and the pieces of processing at steps S12 to S20 are executed. It is to be noted that, when the processing advances to step S12, any product input plan that has been developed before operation of the manufacture line 70 is discarded.

This makes it possible to change, even if a product input plan is developed in advance, the product input plan appropriately when it becomes necessary to change the plan.

Figure 10:
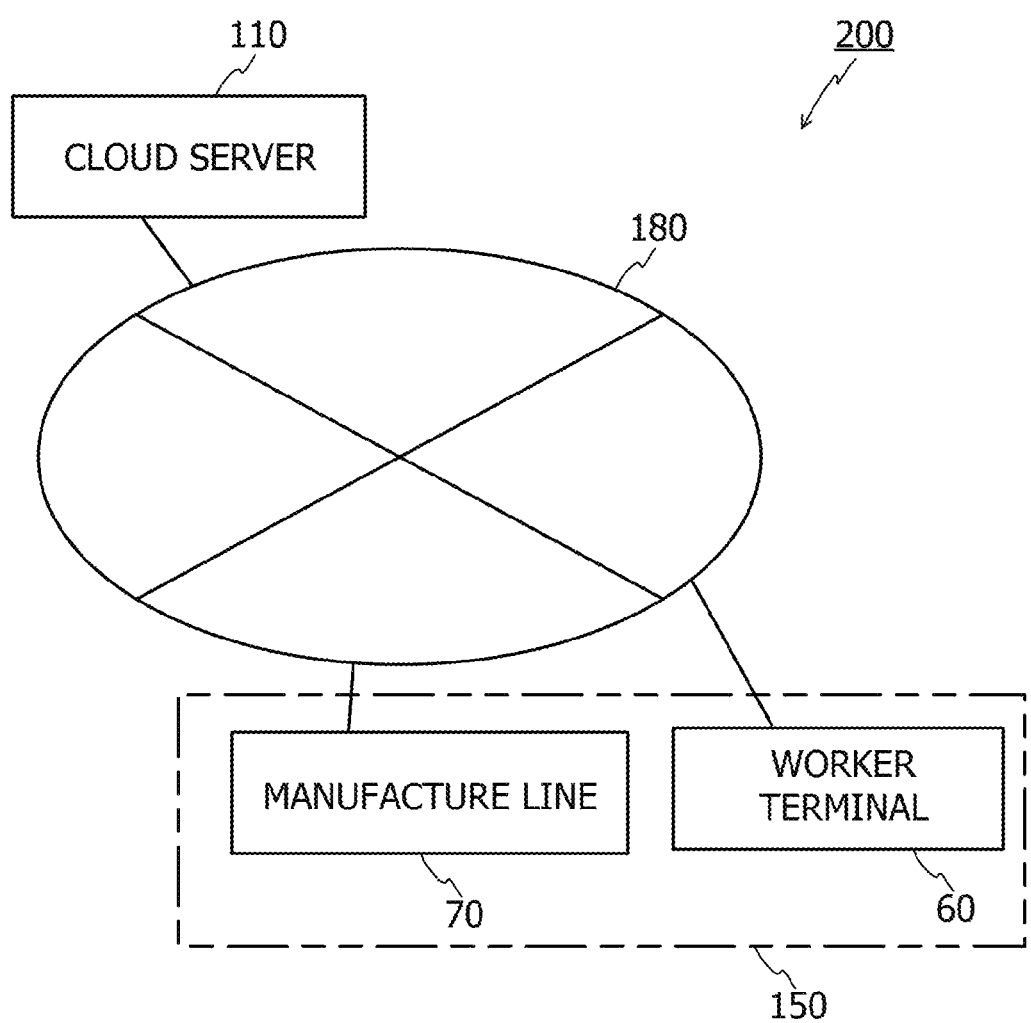
FIG. 10 is a view schematically depicting a configuration of a manufacturing system according to a modification.

It is to be noted that the server 10 may be in an on-premise state in which the server 10 is managed by a company or the like by which the manufacture line 70 is owned as in the embodiment (FIG. 1) described above or may be in a form of a cloud server like a manufacturing system 200 depicted in FIG. 10. A cloud server 110 of FIG. 10 acquires information transmitted from the worker terminal 60 in a factory 150 through a network 180, processes the information and provides a result of the processing to the worker terminal 60. It is to be noted that the countries in which the cloud server 110 and the factory 150 are located may be different from each other.

It is to be noted that the processing functions described above can be implemented by a computer. In this case, a program that describes the processing substance of the functions to be had by the processing device is provided. By executing the program on a computer, the processing functions are implemented on the computer. The program that describes the processing substance can be recorded and retained on a computer-readable recording medium (it is to be noted that carrier waves are excepted).

In the case where the program is to be distributed, it is sold in the form of a portable recording medium such as, for example, a digital versatile disc (DVD), a compact disc read only memory (CD-ROM) or the like in which the program is recorded. Also it is possible to store the program into a storage device of a server computer such that the program is transferred from the server computer to a different computer through a network.

A computer that executes the program stores, for example, the program recorded on a portable recording medium or the program transferred from a server computer into its own storage device. Then, the computer reads the program from the own storage device and executes pieces of processing in accordance with the program. It is to be noted that also it is possible for the computer to read the program directly from the portable recording medium and execute pieces of processing in accordance with the program. Also it is possible for the computer to execute, every time the program is transferred from the server computer, pieces of processing in accordance with the received program.

The embodiment described above is an example of preferred implementation of the present invention. However, the present invention is not limited to this and can be carried out in various modified forms without departing from the subject matter of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A product input plan developing device for developing product input plans including an input order of a plurality of products to a manufacture line that includes a branch and a merge, and paths along which the plurality of products individually flow in the manufacture line, the product input plan developing device comprising:
    a memory; and
    a processor coupled to the memory,
    wherein the processor
        optimizes product input plans for k number of products for which a product input plan is developable without causing information explosion from among the plurality of products to be input to the manufacture line,
        determines adoption of product input plans for first n (n<k) number of products from among the optimized product input plans, and
        repeatedly executes process for optimizing the product input plan and repeatedly executes the process for determination, for a product for which adoption of the product input plan is not determined.

2. The product-input-plan developing device according to claim 1, wherein the processor optimizes the product input plans by multi-objective optimization.

3. The product-input-plan developing device of claim 1, wherein the value of n is determined in response to an interval with which the processor optimizes the product input plans.

4. The product-input-plan developing device of claim 1, wherein, where a displacement occurs between a product input plan prepared in advance and an actual product input to the manufacture line or where there is possibility that the displacement may occur,
    the processor starts process for a plurality of products to be planned to be input to the manufacture line later.

5. A product-input-plan developing method for developing product input plans including an input order of a plurality of products to a manufacture line that includes a branch and a merge, and paths along which the plurality of products individually flow in the manufacture line, the product input plan developing method by which a computer executes process of:
    optimizing product input plans for k number of products for which a product input plan is developable without causing information explosion from among the plurality of products to be input to the manufacture line; and
    determining adoption of product input plans for first n (n<k) number of products from among the optimized product input plans,
    wherein the optimization is repeatedly executed and the determination is repeatedly determined for a product for which adoption of the product input plan is not determined by the determination.

6. The product input plan developing method of claim 5, wherein the optimization optimizes the product input plans by multi-objective optimization.

7. The product input plan developing method of claim 5, wherein the value of n is determined in response to an interval with which the optimization optimizes the product input plans.

8. The product input plan developing method of claim 5, wherein, where a displacement occurs between a product input plan prepared in advance and an actual product input to the manufacture line or where there is the possibility that the displacement may occur,
    the optimization and the determination are started for a plurality of products to be planned to be input to the manufacture line later.

9. A non-transitory computer-readable recording medium storing therein a program for causing a computer to execute a process for developing product input plans including an input order of a plurality of products to a manufacture line that includes a branch and a merge, and paths along which the plurality of products individually flow in the manufacture line, the program execute a process, the process comprising:
    optimizing product input plans for k number of products for which a product input plan is developable without causing information explosion from among the plurality of products to be input to the manufacture line; and
    determining adoption of product input plans for first n (n<k) number of products from among the optimized product input plans,
    wherein the optimization is repeatedly executed and the determination is repeatedly executed for a product for which adoption of the product input plan is not determined by the determination.

* * * * *